(12) United States Patent
Skinner

(10) Patent No.: US 7,555,571 B1
(45) Date of Patent: Jun. 30, 2009

(54) ACTIVATION OF MOBILE COMPUTING DEVICE ON A CELLULAR NETWORK

(75) Inventor: Craig S. Skinner, Snohomish, WA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

(21) Appl. No.: 11/484,184

(22) Filed: Jul. 10, 2006

Related U.S. Application Data

(63) Continuation of application No. 09/755,781, filed on Jan. 5, 2001, now abandoned.

(51) Int. Cl.
 *G06F 3/00* (2006.01)
 *G06F 13/12* (2006.01)
 *G06F 15/177* (2006.01)
 *G06F 15/16* (2006.01)

(52) U.S. Cl. .................. 710/10; 709/220; 709/221; 709/222; 709/250; 710/62; 710/72

(58) Field of Classification Search .............. None
 See application file for complete search history.

(56) References Cited

U.S. PATENT DOCUMENTS

| | | | |
|---|---|---|---|
| 5,010,547 | A | 4/1991 | Johnson et al. |
| 5,012,219 | A | 4/1991 | Henry |
| 5,075,684 | A | 12/1991 | DeLuca |
| 5,359,317 | A | 10/1994 | Gomez et al. |
| 5,394,140 | A | 2/1995 | Wong et al. |
| 5,430,436 | A | 7/1995 | Fennell |
| 5,485,505 | A | 1/1996 | Norman et al. |
| 5,612,682 | A | 3/1997 | DeLuca et al. |
| 5,621,784 | A | 4/1997 | Tiedemann, Jr. et al. |
| 5,650,776 | A | 7/1997 | Mitchell et al. |
| 5,705,995 | A | 1/1998 | Laflin et al. |
| 5,758,069 | A | 5/1998 | Olsen |
| 5,819,173 | A | 10/1998 | Lawrence et al. |
| 5,839,054 | A * | 11/1998 | Wright et al. .............. 340/7.29 |
| 5,850,599 | A | 12/1998 | Seiderman |
| 5,859,419 | A | 1/1999 | Wynn |
| 5,903,852 | A | 5/1999 | Schaupp, Jr. et al. |

(Continued)

FOREIGN PATENT DOCUMENTS

EP 0464988 A2 1/1992

(Continued)

OTHER PUBLICATIONS

U.S. Appl. No. 09/732,066, filed Dec. 7, 2000, Skinner et al.

(Continued)

*Primary Examiner*—Alan Chen
(74) *Attorney, Agent, or Firm*—Foley & Lardner LLP

(57) ABSTRACT

An automated network registration and activation system and method of the present invention automatically configures a communication network device for communicating on a network and automatically handles the communication network registration and activation. In one embodiment a processor automatically configures a device for communicating on a communication network with automated registration and activation on the communication network. In one exemplary implementation, network configuration information includes a network unit device identifier (e.g., a MAN) and the present invention automatically registers and activates a device with a communication network when requested to activate by a user tapping on an activation application or being taken to the activation application.

16 Claims, 7 Drawing Sheets

U.S. PATENT DOCUMENTS

| | | | |
|---|---|---|---|
| 5,956,636 A | 9/1999 | Lipsit | |
| 5,958,006 A | 9/1999 | Eggleston et al. | |
| 6,044,403 A * | 3/2000 | Gerszberg et al. | 709/225 |
| 6,047,066 A | 4/2000 | Brown et al. | |
| 6,124,799 A | 9/2000 | Parker | |
| 6,157,630 A | 12/2000 | Adler et al. | |
| 6,175,860 B1 | 1/2001 | Gaucher | |
| 6,208,853 B1 | 3/2001 | Lo Vasco et al. | |
| 6,223,030 B1 * | 4/2001 | Van Den Heuvel et al. | 455/435.2 |
| 6,240,185 B1 | 5/2001 | Van Wie et al. | |
| 6,282,421 B1 | 8/2001 | Chatterjee et al. | |
| 6,292,833 B1 | 9/2001 | Liao et al. | |
| 6,301,666 B1 | 10/2001 | Rive | |
| 6,480,762 B1 | 11/2002 | Uchikubo et al. | |
| 6,490,445 B1 | 12/2002 | Holmes | |
| 6,519,470 B1 | 2/2003 | Rydbeck | |
| 6,526,275 B1 | 2/2003 | Calvert | |
| 6,539,101 B1 | 3/2003 | Black | |
| 6,549,773 B1 | 4/2003 | Linden et al. | |
| 6,564,056 B1 | 5/2003 | Fitzgerald | |
| 6,564,104 B2 | 5/2003 | Nelson et al. | |
| 6,587,684 B1 | 7/2003 | Hsu et al. | |
| 6,591,098 B1 * | 7/2003 | Shieh et al. | 455/419 |
| 6,594,482 B1 | 7/2003 | Findikli et al. | |
| 6,600,743 B1 | 7/2003 | Lee et al. | |
| 6,603,969 B1 | 8/2003 | Vuoristo et al. | |
| 6,636,489 B1 | 10/2003 | Fingerhut | |
| 6,681,259 B1 | 1/2004 | Lemiläenen et al. | |
| 6,686,838 B1 | 2/2004 | Rezvani et al. | |
| 6,732,176 B1 | 5/2004 | Stewart et al. | |
| 6,745,011 B1 | 6/2004 | Hendrickson et al. | |
| 6,745,029 B2 | 6/2004 | Lahtinen et al. | |
| 6,829,596 B1 | 12/2004 | Frazee | |
| 6,829,704 B2 | 12/2004 | Zhang et al. | |
| 6,961,567 B1 | 11/2005 | Kuhn | |
| 7,010,603 B2 | 3/2006 | Martin, Jr. et al. | |
| 7,359,516 B1 | 4/2008 | Skinner et al. | |
| 2002/0045457 A1 | 4/2002 | Taniguchi | |
| 2002/0073046 A1 | 6/2002 | David | |
| 2002/0082049 A1 | 6/2002 | Prise | |
| 2002/0152400 A1 | 10/2002 | Zhang et al. | |
| 2002/0161990 A1 | 10/2002 | Zhang et al. | |
| 2003/0013434 A1 | 1/2003 | Rosenberg et al. | |
| 2003/0055912 A1 | 3/2003 | Martin, Jr. et al. | |
| 2003/0162533 A1 | 8/2003 | Moles et al. | |
| 2004/0254827 A1 | 12/2004 | Hind et al. | |
| 2005/0009514 A1 | 1/2005 | Mathews et al. | |
| 2005/0021458 A1 | 1/2005 | Rowe | |
| 2006/0030306 A1 | 2/2006 | Kuhn | |
| 2007/0169084 A1 | 7/2007 | Frank et al. | |
| 2007/0178899 A1 | 8/2007 | Kuhn | |

FOREIGN PATENT DOCUMENTS

| | | |
|---|---|---|
| EP | 0464988 A3 | 1/1992 |
| EP | 0 820 206 B1 | 1/1998 |
| EP | 0 825 791 A1 | 2/1998 |
| EP | 0 862 104 A2 | 9/1998 |
| EP | 1551193 | 7/2005 |
| WO | WO2005/022375 A1 | 3/2005 |
| WO | WO2006/055716 A1 | 5/2006 |
| WO | WO2007/070510 A2 | 6/2007 |

OTHER PUBLICATIONS

"Initial *Provisioning of a Cellular Device over the Air*", IBM Technical Disclosure Bulletin, Jun. 1995, vol. 38, No. 6, Jul. 1, 1995 (pp. 201-202).

U.S. Appl. No. 09/850,940, filed May 8, 2001, Applicant: Kuhn et al.; Title: "Activation Key for a Wireless-Enabled Device"; Amendment and Reply dated Sep. 1, 2006.

U.S. Appl. No. 11/218,346, filed Aug. 31, 2005, Applicant: Kuhn; Title: "Generic Activation and Registration Framework for Wireless Devices"; Preliminary Amendment dated Oct. 25, 2006.

U.S. Appl. No. 11/646,177, filed Dec. 27, 2006, Applicant: Kuhn; Title: Generic Activation and Registration Framework for Wireless Devices; Preliminary Amendment dated Dec. 27, 2006.

U.S. Appl. No. 11/646,182, filed Dec. 27, 2006, Applicant: Kuhn; Title: "Activation Key for a Wireless Enabled Device"; Preliminary Amendment dated Dec. 27, 2006.

United States Patent and Trademark Office, Office communication re U.S. Appl. No. 09/850,940, filed May 8, 2001, mail date Jul. 16, 2007, 9 pages.

Foley & Lardner LLP, Attorney Steven C. Becker, Amendment and Reply Under 37 C.F.R. 1.111 re U.S. Appl. No. 09/850,940, filed May 8, 2001, filed with PTO Oct. 17, 2007, 12 pages.

International Search Report and Written Opinion of the International Searching Authority in International Application PCT/US2006/047358, European Patent Office, Oct. 1, 2007, 15 pages.

* cited by examiner

100A

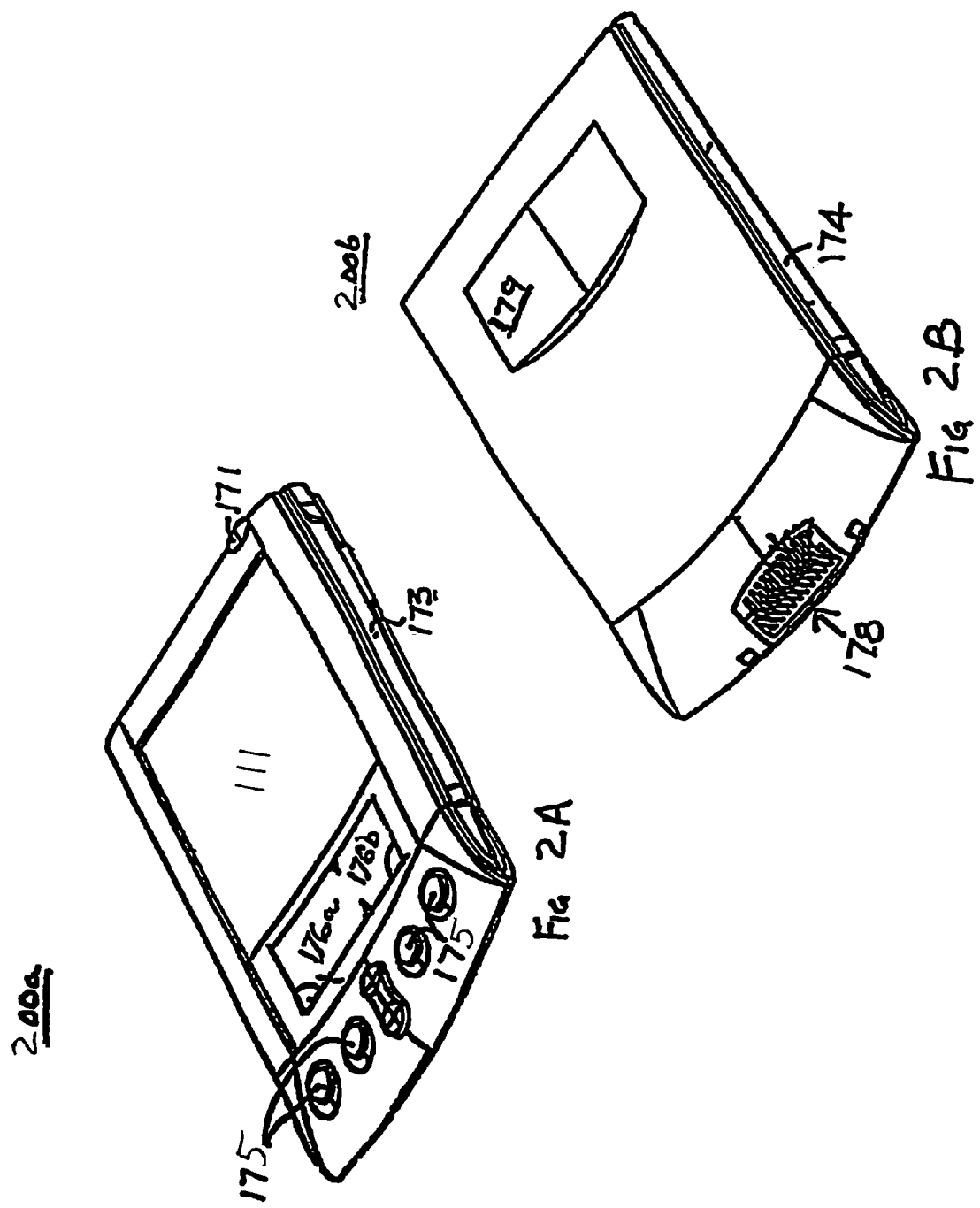

ACTIVATION OF MOBILE COMPUTING DEVICE ON A CELLULAR NETWORK

RELATED APPLICATIONS

This application is a continuation and claims the benefit of the and commonly-owned U.S. patent application Ser. No. 09/755,781 filed Jan. 5, 2001 now abandoned, entitled "AUTOMATIC NETWORK REGISTRATION AND ACTIVATION FOR A WIRELESS COMMUNICATIONS NETWORK DEVICE" which is hereby incorporated by this reference.

BACKGROUND OF THE INVENTION

1. Field of the Invention

This invention relates to the field of handheld computers. In particular, the present invention relates to an efficient communication network activation method and system.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reductions in analyzing and communicating data, ideas and trends in most areas of business, science, education and entertainment. Electronic systems designed to produce these results often include distributed communication devices that communicate over a network. Typically, a device has to be registered with a network controller before communicating on a communication network and traditional communication network registration and activation processes require significant complicated user input to complete.

Communication network registration and activation typically involves obtaining information from a network operator or vendor (e.g., a public network vendor such as Bell South) that is utilized to configure a device for communication on the network. For example, most communication network management and control protocols typically require the devices coupled to the network to be identified (e.g., so that information is delivered properly). The Mobitex communication network usually assigns a communication device a Mobitex access number (MAN) that is used to configure a device for communications on the Mobitex network. The number and variety of devices that are registered and activated on communication networks is increasing rapidly. For example, numerous computer systems are coupled to public communications networks (e.g., communication networks of public telephone operators) and utilize information communicated over the network for a variety of activities (e.g., interacting with the Internet).

As the components required to build a computer system have reduced in size, new categories of computer systems have emerged. One of the new categories of computer systems is the hand held or "palmtop" computer system. A palmtop computer system is a computer that is small enough to be held in the hand of a user and is often "palm-sized." One of the most significant benefits of a palm top computer is mobility. The mobility typically permits a user to utilize the device when traveling away from a fixed location. A user is often engaged in other activities and the easier a hand held computer is to use the easier it is for a user to continue to perform the other activities while using the palmtop computer.

Palmtop computer systems are often used as Personal Digital Assistants (PDAs) to implement various Personal Information Management (PIM) applications such as an address book, a daily organizer, and electronic notepads, to name a few. Even though palmtop computer systems are very small, they typically provide diverse functionality and their capabilities are constantly increasing. A variety of different computer program applications are typically included in a hand held computer and as the computational power and memory capabilities of a hand held computer increase more and more applications are expected to be available for use in a palm top computer. For example, some Palmtop computers have wireless communication capabilities and utilize public cellular communication networks to exchange information with other devices. The ability to communicate with other devices provides numerous benefits including allowing the relatively limited palmtop computer to have access to the computational power and memory of distributed resources. To communicate over a network Palmtop computers typically have to be registered and activated on the network.

Traditional communication devices typically require a complicated series of manual interactions with the device and the communication network to complete registration and activation of the device on a network (e.g., establishing a network account). Typically, a device has to be brought to a service representative for registration and activation. This is often inconvenient and consumes service representative resources. The registration and activation is also often location dependent and requires a different read only memory (ROM) for different locations. Even if a user tries to register and activate the device themselves they usually have to contact the communication vendor and provide technical information about the device (e.g., the configuration of the device) to the vendor. After the user has provided the information to the vendor regarding the device the vendor provides an activation and registration number (e.g., a MAN number) that the user has to input to the device. These processes requiring the user to understand and provide technical information are often difficult for the average user to understand.

What is required is a system and method that facilitates automated registration and activation of a communication device on a wireless communication network.

SUMMARY OF THE INVENTION

The present invention system and method facilitates automated registration and activation of a communication device on a wireless communication network. An automated network registration and activation system and method of the present invention automatically configures a communication network device for communicating on a network and automatically handles the communication network registration and activation. The present invention network registration and activation system and method utilizes network configuration information loaded by a manufacturer or supplier that relieves the user from having to manually provide the network configuration information to a network controller (e.g., a public communications network provider such as Bell South).

In one embodiment of the present invention, a communications network automated registration and activation system includes a processor, a network interface component, a read only memory and a data bus. The processor processes information and instructions including network configuration information utilized by the processor to automatically configure a device for communicating on a communication network with automated registration and activation on the communication network. The network interface component communicates information to and from other network devices. A read only memory stores static information and instructions including the network configuration information. The data bus communicates information between the processor, network interface component and the read only memory.

In one embodiment of the present invention, network configuration information includes a network unit device identifier (e.g., a MAN) and the communication network device automated registration and activation system does not have to engage in an extensive exchange of information with a network controller (e.g., a public telephone service provider). In one exemplary implementation of the present invention, a communication network device automated registration and activation system automatically registers and activates itself with a communication network when requested to activate by a user tapping on an activation application or being taken to the activation application. The communication network device automated registration and activation system is compatible with a variety of communication networks including Mobitex, cellular digital packet data (CDPD) networks, code division multiple access (CDMA) networks, and General Packet Radio Service (GPRS). In one embodiment, a present invention communication network device registration and activation system is included in a palmtop computer.

BRIEF DESCRIPTION OF THE DRAWINGS

FIG. 2A is a perspective illustration of the top face of one embodiment of a hand held or palmtop computer system comprising a present invention communication network device registration and activation system.

FIG. 2B illustrates the bottom side of one embodiment of a hand held or palmtop computer system comprising a present invention communication network device registration and activation system.

DETAILED DESCRIPTION OF THE INVENTION

Reference will now be made in detail to the preferred embodiments of the invention, a system and method to automatically register and activate a device on a communications network, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention assists efficient and easy configuration of a device for communication on a network including registration and activation of the device on the communications network. A communication network device automated registration and activation system and method of the present invention automates the exchange of information associated with registration and activation of a communications device on a network. The communication network device automated registration and activation system and method does not require a user to engage in a complicated series of manual interactions with the device and the communication network to configure the device for network communications or to complete registration and activation of the device on the network (e.g., establishing a network account). A present invention communication device does not require a service representative to perform the registration and activation and is not location dependent. The present invention enables one read only memory (ROM) image for a device (e.g., a PDA) to provide multiple configuration schemes including communication network configuration with automated registration and activation on the communication network.

Figure 1A:
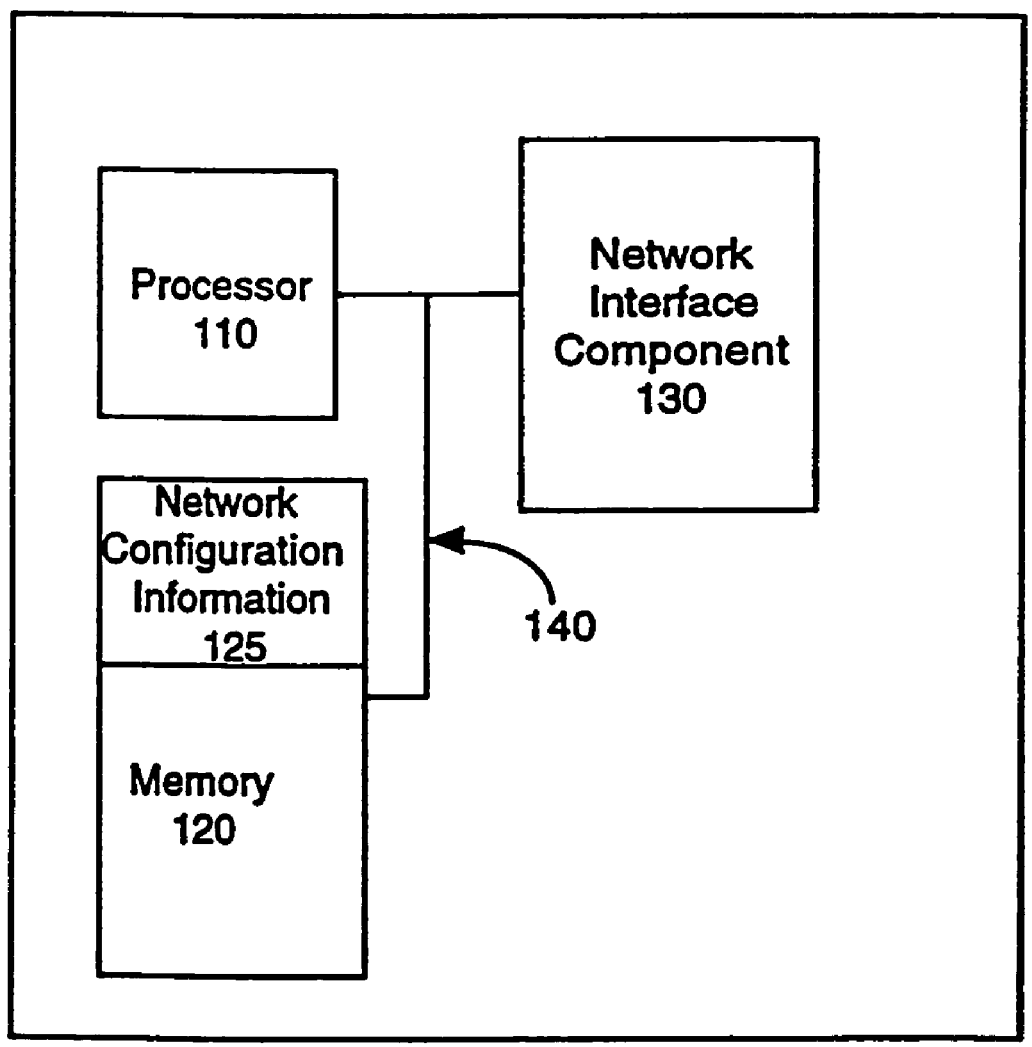
FIG. 1A is an illustration of a communication network device automated registration and activation system, one embodiment of the present invention.

FIG. 1A is an illustration of communication network device automated registration and activation system 100, one embodiment of the present invention. Communication network device automated registration and activation system 100 facilitates communication network registration and activation. Communication network device registration and activation system 100 comprises processor 110, network interface component 130, communication bus 140, and memory 120 which includes network registration and activation information 125. Processor 110 processes information and instructions including network communication information such as the information included in network configuration information 125. Network interface component 130 provides a communication port for communicating information to and from other network devices (not shown). Memory 120 stores information for processor 110 including network configuration information 125. Network configuration information 125 includes information required to register and activate a device on a communications network. Communication bus 140 provides a communication path between the components of communication network device automated registration and activation system 100.

Figure 1B:
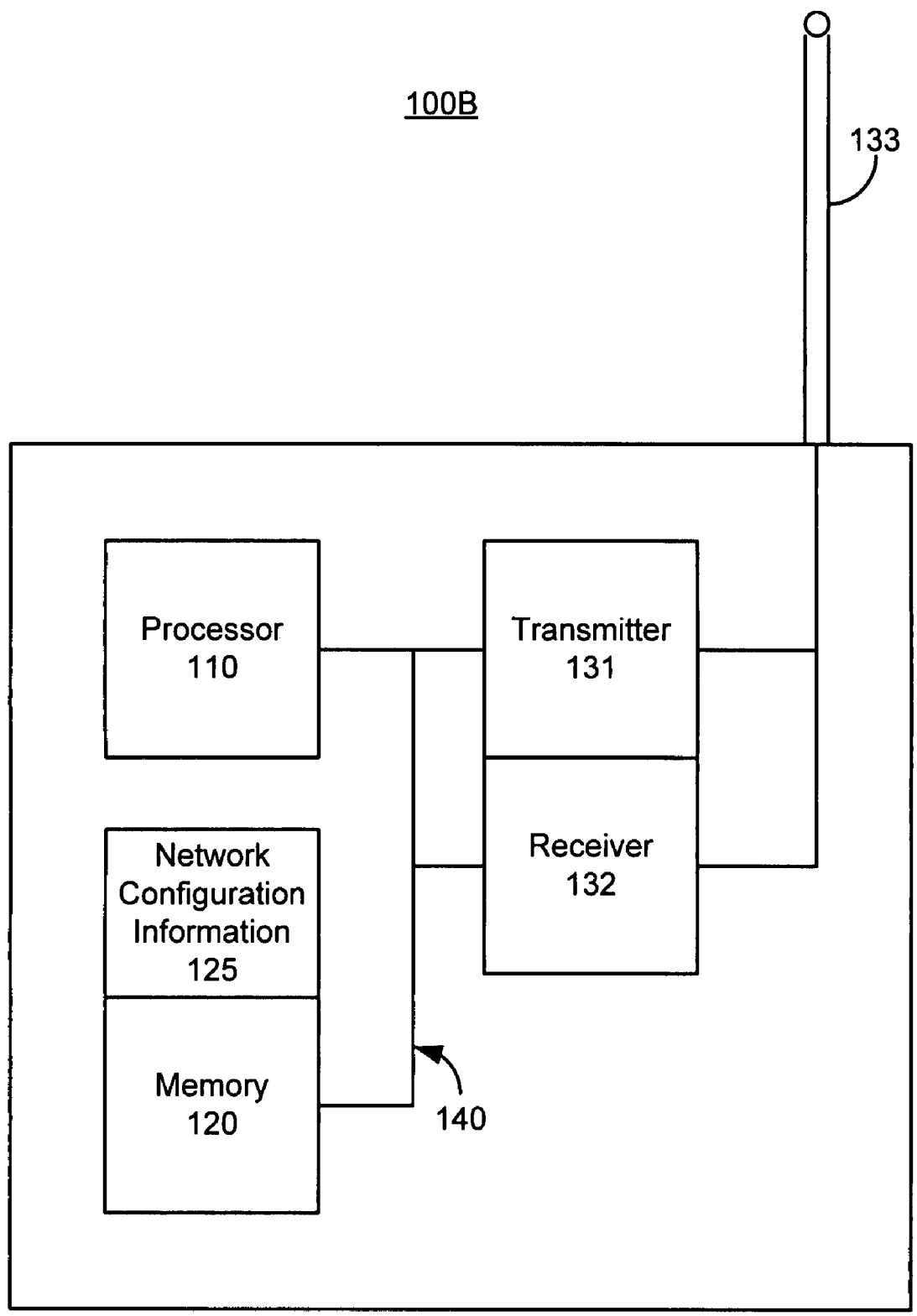
FIG. 1B is a block diagram of one embodiment of a communication network device automated registration and activation system configured for communications with a cellular communications network.

FIG. 1B is a block diagram of one embodiment of communication network device automated registration and activation system 100 configured for communications with a cellular communications network (not shown). In this embodiment network interface component 130 comprises transmitter 131, receiver 132 and antenna 133. Transmitter 131 and receiver 132 are coupled to communication bus 140 and antenna 133. Transmitter 131 generates radio signals for communicating information over a cellular communication network (e.g., a Mobitex network). Receiver 132 accepts radio signals from a cellular communication network. Antenna 133 transmits and receives the radio signals to and from a cellular communication network.

In one embodiment of the present invention, network configuration information 125 includes information for configuring communication network device automated registration and activation system 100 for automated registration and activation on a communication network. In one embodiment of the present invention, when communication network device automated registration and activation system 100 boots up and the device has not previously been registered and activated on a communication network, processor 110 analyzes network configuration information 125 to determine appropriate network registration and activation requirements. Processor 110 then automatically configures communication network device automated registration and activation system 100 for communication on a network and automatically handles the communication network registration and activation. In one exemplary implementation of the present invention, the network configuration information 125 is loaded by a manufacturer (e.g., an original equipment manufacturer).

In one embodiment of the present invention, network configuration information 125 includes a network unit device identifier (e.g., a MAN) and communication network device automated registration and activation system 100 does not have to engage in an extensive exchange of information with a network controller (e.g., a public telephone service provider). Communication network device automated registration and activation system 100 provides the network unit device identifier to the network controller (e.g., a public communications network supplier) and the network controller retrieves information from storage previously associated with the network unit device identifier. In one exemplary implementation of the present invention, the manufacturer or supplier of communication network device automated registration and activation system 100 provides other requisite information (e.g., type of device, communications capabilities, protocol compatibility, etc.) associated with a device assigned a network unit identifier to the network controller.

In one embodiment of the present invention, communication network device automated registration and activation system 100 automatically registers and activates itself with a communication network when requested to activate by a user. In one exemplary implementation of the present invention, a user requests communication network device automated registration and activation system 100 to register and activate itself with a communication network by tapping on an activation application or being taken to the activation application. Data included in network configuration information 125 enables communication network device automated registration and activation system 100 to provide a good user experience with minimal required user interaction. Communication network device automated registration and activation system 100 is compatible with a variety of communication networks including Mobitex, cellular digital packet data (CDPD) networks, code division multiple access (CDMA) networks, and General Packet Radio Service (GPRS). In one embodiment of the present invention, communication network device automated registration and activation system 100 is capable of engaging in a traditional communication network registration and activation process if data included in network configuration information 125 does not enable the device to be configured for a particular network (e.g., a public communication network of a particular vendor such as Cellular One).

In one embodiment a present invention, communication network device registration and activation system in included in a palmtop computer. FIG. 2A is a perspective illustration of the top face 200a of communication network device registration and activation system 200. The top face 200a includes a display screen 111 for displaying images and information to a user. In one embodiment of the present invention display screen 111 is a touch screen able to register contact, for example contact between the screen and the tip of the stylus 173 or a finger. FIG. 2A also illustrates a handwriting recognition pad or "digitizer" comprising two regions 176a and 176b. Region 176a is for the drawing of alpha characters therein for automatic recognition and region 176b is for the drawing of numeric characters therein for automatic recognition. A removable stylus 173 and buttons 175 are also shown. The stylus 173 is used for stroking a character within one of the regions 176a and 176b. The stroke information is then fed to an internal processor for automatic character recognition. Once characters are recognized, they are typically displayed on the screen 111 for verification and/or modification. In one embodiment of the present invention stylus 173 is also used to select items when display screen 111 includes touch screen capabilities. The top face 200a also includes one or more dedicated and/or programmable buttons 175 for selecting information and causing the computer system to implement functions.

FIG. 2B illustrates the bottom side 200b of one embodiment of a hand held or palmtop computer system comprising communication network device registration and activation system 200. An optional extendible antenna 174, a battery storage compartment door 179, and a serial communication interface 178 are shown. Communication network device registration and activation system 200 is utilized to access and activate a number of applications including communication applications. Extendible antenna 174 is utilized for wireless communications (e.g., cellular phone, radio, etc.). Serial communication interface 178 provides a communication port for communications with peripheral devices (e.g., a palm cradle, landline phone modem, etc.). Battery storage compartment door 179 provides access for battery replacement.

Figure 3:
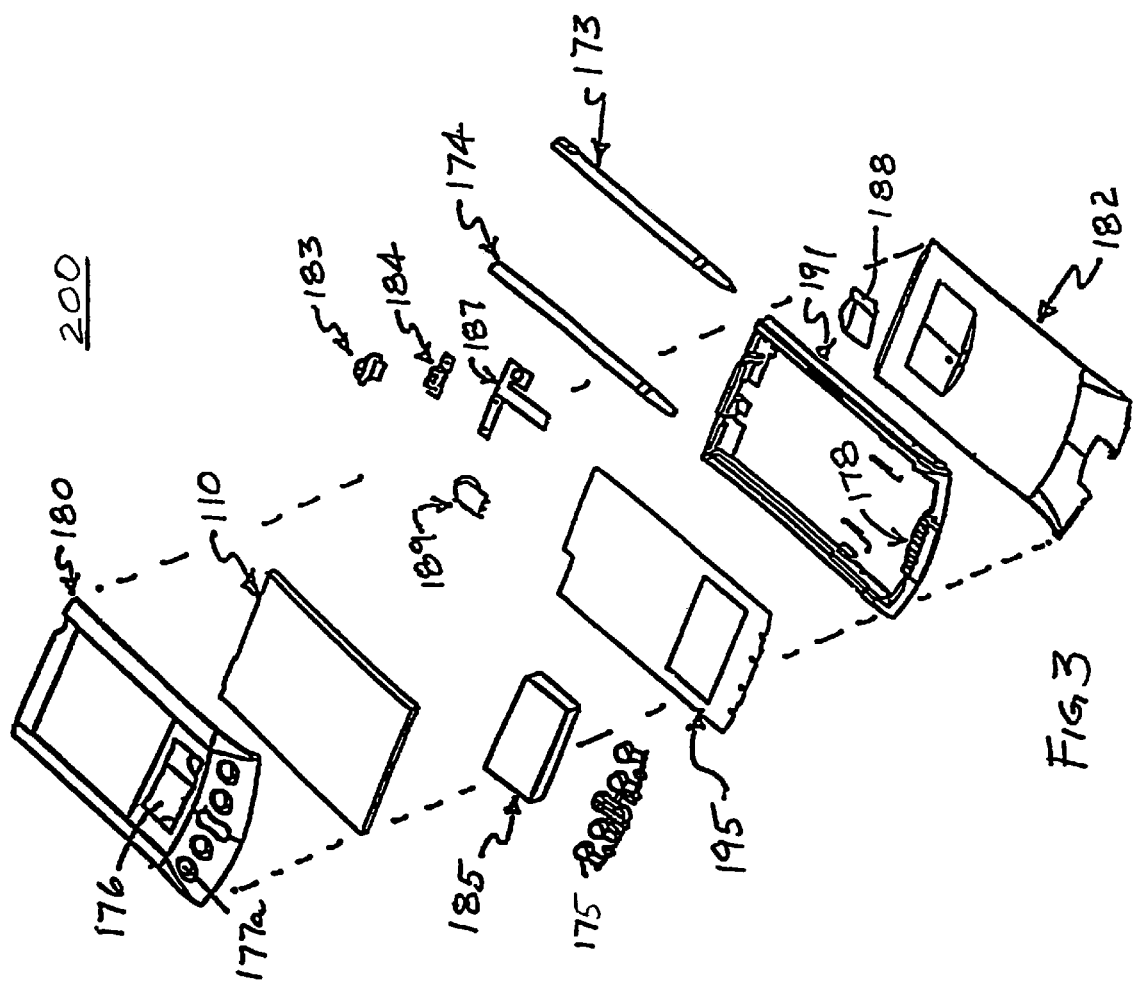
FIG. 3 is an exploded view of the hand held computer system in accordance with one implementation of the present invention.

FIG. 3 is an exploded view of the hand held computer comprising communication network device registration and activation system 200 in accordance with one implementation of the present invention. The hand held computer system includes front cover 180 having an outline of region 176 and holes 177a for receiving buttons 175. The flat panel display screen 111 (e.g., including a liquid crystal display and touch screen) fits into front cover 180. Any of a number of display technologies can be used (e.g., LCD, FED, plasma, etc.) for the flat panel display included in display screen 111. A battery 188 provides electrical power. On/off button 183 is shown along with an infrared emitter and detector device 184. A flex circuit 187 is shown along with a PC board 195 containing electronics and logic (e.g., memory, communication bus, processor, etc.) for implementing computer system functionality. The digitizer pad 185 is also included in PC board 195. A midframe 191 for holding stylus 173 and coupling front cover 181 to back cover 182 is also shown. Position adjustable antenna 174 for transmitting and receiving communication signals is shown and radio receiver/transmitter device 189 is also shown between the midframe and the rear cover 182 of FIG. 3. The receiver/transmitter device 189 is coupled to the antenna 174 and also coupled to communicate with the PC board 195. In one implementation of the present invention, the Mobitex wireless communication system is used to provide two way communication between system 200 and other networked computers and/or the Internet via a proxy server. Communication interface 178 is coupled to PC board 195 and provides a communications port (e.g., a serial port) for communicating signals to and from a peripheral device or other network communication devices (not shown).

Figure 4A:
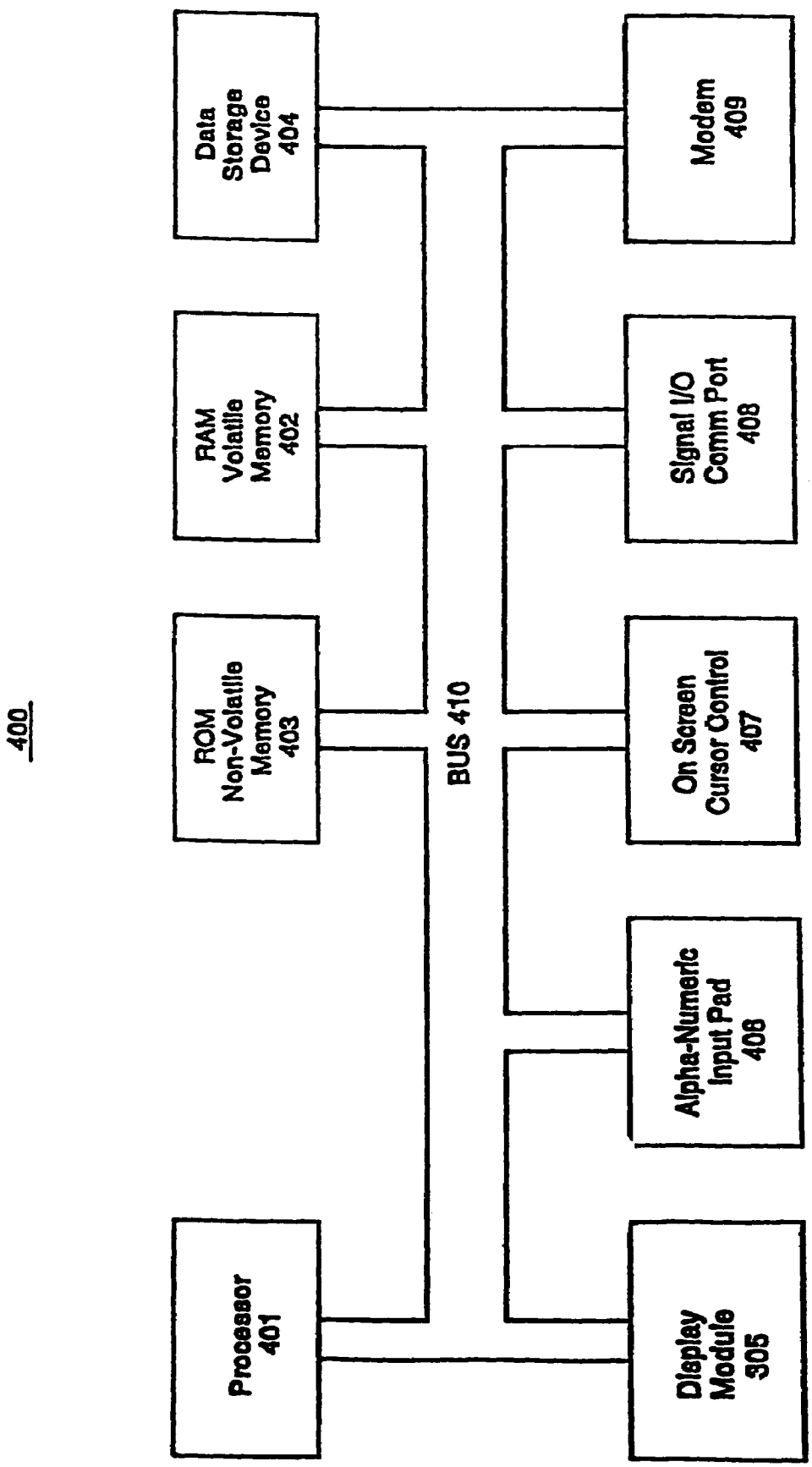
FIG. 4A is a block diagram of a computer system, some of which is implemented on PC board included in one embodiment of the present invention.

FIG. 4A is a block diagram of computer system 400, some of which is implemented on PC board 195. Computer system 400 includes address/data bus 410, central processor 401, volatile memory 402 (e.g., random access memory RAM), non-volatile memory 403 (e.g., read only memory ROM), optional removable data storage device 404 (e.g., memory stick), display module 305, optional alphanumeric input device 406, optional cursor control or directing device 407, and signal communication port 408, modem 409. Address/data bus 410 is coupled to central processor 401, volatile memory 402 (e.g., random access memory RAM), non-volatile memory 403 (e.g., read only memory ROM), optional removable data storage device 404 (e.g., memory stick), display module 305, optional alphanumeric input device 406, optional cursor control or directing device 407, and signal communication port 408, modem 409.

The components of computer system 400 cooperatively function to provide a variety of functions, including PIM, communications, etc. Address/data bus 410 communicates information, central processor 401 processes information and instructions, volatile memory 402 (e.g., random access memory RAM) stores information and instructions for the central processor 401 and non-volatile memory 403 (e.g., read only memory ROM) stores static information and instructions. Optional removable data storage device 404 (e.g., memory stick) also stores information and instructions. Display module 305 displays information to the computer user and an optional alphanumeric input device 406 is an input device, which in one implementation is a handwriting recognition pad ("digitizer") having regions 176a and 176b (see FIG. 2A).

Optional cursor directing device 407 also communicates user input information and command selections to the central processor 401 via a touch screen capable of registering a position on the screen of display module 305 where the stylus makes contact. Signal Communication port 408 is a communication interface (e.g., a serial communications port) for communicating signals to and from a coupled peripheral device (not shown). Modem 409 facilitates communications with other devices.

Figure 4B:
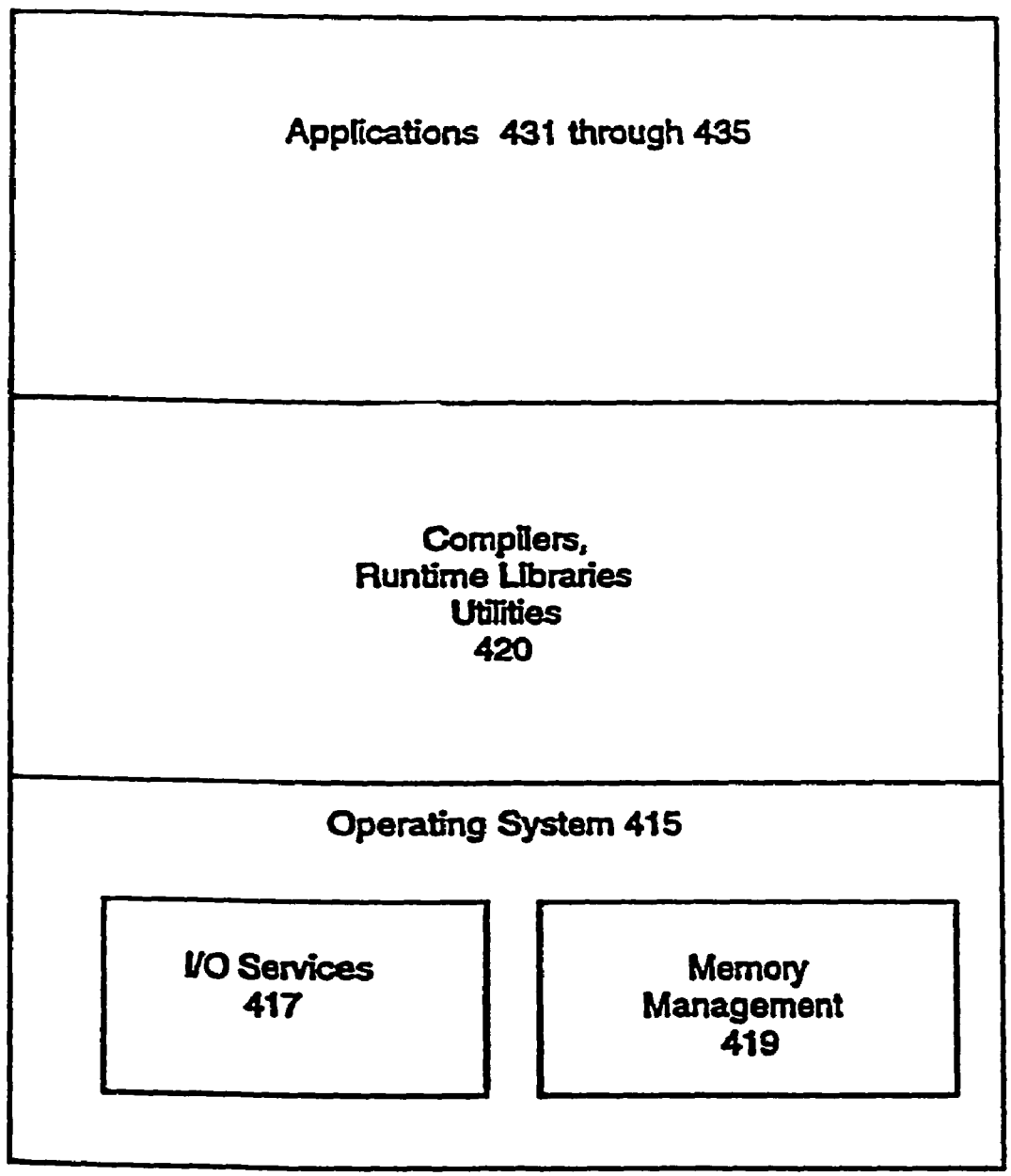
FIG. 4B is a block diagram illustrating a logical view of one embodiment of the software computer program elements of a present invention communication network device registration and activation system.

FIG. 4B is a block diagram illustrating a logical view of one embodiment of the software computer program elements of communication network device registration and activation system 100. An operating system 415 (e.g., DOS, UNIX, etc.) provides various system services to other programs executing on the computer system. In one exemplary embodiment, operating system 415 includes input/output (I/O) services 417 and memory management service 419. I/O services 417 facilitate access to I/O devices. Memory management service 419 provides management of allocation and deallocation of memory, including virtual memory addressing or static memory addressing. Also shown are programming language compilers, software tool/utilities and their runtime libraries included in block 420 for application execution.

Applications 431 through 435 shown in FIG. 4B are applications available to run on communication network device registration and activation system 100 and utilizes the other system services (e.g., operating system 415). Applications 431 through 435 comprise processing procedures performed by communication network device registration and activation system 100 to implement different functions (e.g., communications, calendar, address book, etc.). The different levels of programming shown in FIG. 4B typically reside on a computer readable memory (e.g., a main memory 402, mass storage device 404, etc.) and include instructions for processor 401.

Figure 5:
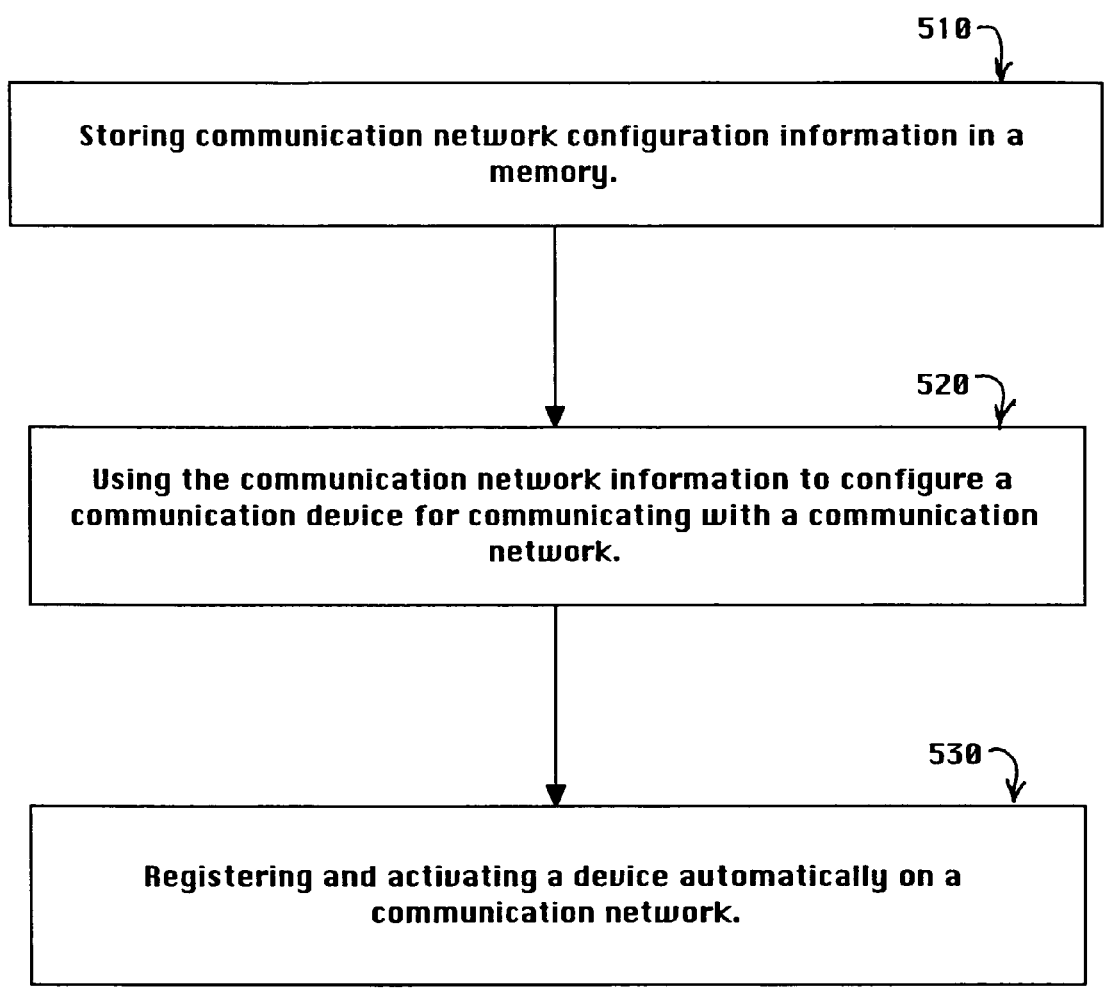
FIG. 5 is a flow chart of communication network device configuration method, one embodiment of the present invention.

FIG. 5 is a flow chart of communication network device configuration method 500. Communication network device configuration method 500 automatically configures a device for communication on a network and assists efficient and easy registration and activation of a device on a communications network. Communication network device configuration method 500 automates the exchange of information associated with registration and activation of a communications device on a network. A user is not required to engage in a complicated series of manual interactions with the device and the communication network to complete registration and activation of the device on a network (e.g., establishing a network account).

In step 510 communication network configuration information is stored in a memory. In one embodiment of the present invention, the network configuration information includes information for automated registration and activation on a communication network. In one embodiment of the present invention, network configuration information 125 includes a network unit device identifier (e.g., a MAN) and there is no requirement to exchange other information with a network controller (e.g., the device type and capabilities). In one exemplary implementation of the present invention, the network configuration information is loaded by a manufacturer and other information associated with the particular device (e.g., a PDA) and required by the network operator is forwarded to the network operator by the manufacturer.

In step 520 the communication network configuration information is used to configure a communication device for communicating with a communication network. In one exemplary implementation of the present invention a processor utilizes the communication network configuration information stored in step 510 to automatically configure the device for communication on a network. Communication network device configuration method 500 is adaptable to automatically configuring itself for communication with a variety of communication networks (e.g., Mobitex, CDPD, CDMA GPRS, etc.).

In step 530 the device is automatically registered and activated on a communication network. In one exemplary implementation of the present invention a processor automatically handles the communication network registration and activation. In one embodiment of the present invention the processor is instructed to forward a communication network unit identifier when the device is booted up or a network communication application is opened.

Thus, the present invention system and method facilitates automated registration and activation of a communication device on a wireless communication network. A communication network device automated registration and activation system and method of the present invention automates the exchange of information associated with registration and activation of a communications device on a network. The communication network device automated registration and activation system and method does not require a user to engage in a complicated series of manual interactions with the device and the communication network to configure the device for network communications or to complete registration and activation of the device on the network (e.g., establishing a network account).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A mobile computing device, comprising:
a non-volatile memory to store network configuration data loaded by a manufacturer; and
a processor circuit to receive a device identifier and to establish a network account for the mobile computing device for cellular communication with a cellular network controller by a) providing the device identifier to the cellular network controller and b) using the network configuration data, the processor to configure the mobile computing device for wireless communication with the cellular network controller in response to a user request, wherein the processor is configured to receive the user request by the user tapping on an activation application displayed on a touch screen.

2. The mobile computing device of claim 1, wherein the device identifier comprises a network access number.

3. The mobile computing device of claim 1, further comprising a user input device configured to receive the device identifier from the user.

4. The mobile computing device of claim 1, wherein the non-volatile memory stores the device identifier loaded by a manufacturer.

5. The mobile computing device of claim 1, the processor to receive network unit identification data from the cellular network controller, the processor to configure the mobile computing device for wireless communication with the cellular network controller based on the network unit identification data.

6. The mobile computing device of claim 1, wherein the mobile computing device is a palmtop computer.

7. The mobile computing device of claim 1, wherein the processor is configured to communicate with the cellular network controller using at least one of a code division multiple access protocol and a general packet radio service protocol.

8. The mobile computing device of claim 1, wherein the non-volatile memory is configured to store multiple sets of network configuration data.

9. The mobile computing device of claim 1, wherein the non-volatile memory and processor circuit are on a circuit board.

10. A mobile computing device, comprising:
a transceiver circuit configured for communication over a cellular network;
a non-volatile memory to store network configuration data loaded by a manufacturer;
a user interface configured to receive a user request; and
a processor circuit configured to receive a device identifier and, in response to the user request, to establish a network account for the mobile computing device by a) providing the device identifier to a cellular network controller and b) using the network configuration data, to configure the mobile computing device for cellular communication with the cellular network controller, wherein the processor is configured to receive the user request by the user tapping on a touch screen.

11. The mobile computing device of claim 10, wherein the device identifier comprises a network access number.

12. The mobile computing device of claim 10, wherein the non-volatile memory stores the device identifier loaded by a manufacturer.

13. The mobile computing device of claim 10, wherein the mobile computing device is a palmtop computer.

14. The mobile computing device of claim 10, wherein the processor is configured to communicate with the cellular network controller using at least one of a code division multiple access protocol and a general packet radio service protocol.

15. The mobile computing device of claim 10, wherein the non-volatile memory is configured to store multiple sets of network configuration data.

16. The mobile computing device of claim 10, wherein the non-volatile memory and processor circuit are on a circuit board.

* * * * *